Aug. 29, 1939.  J. G. WAGNER  2,170,880
COOKING UTENSIL
Filed Dec. 2, 1938   2 Sheets-Sheet 1

INVENTOR
JOSEPH G. WAGNER
ATTORNEYS

Aug. 29, 1939.  J. G. WAGNER  2,170,880
COOKING UTENSIL
Filed Dec. 2, 1938  2 Sheets-Sheet 2
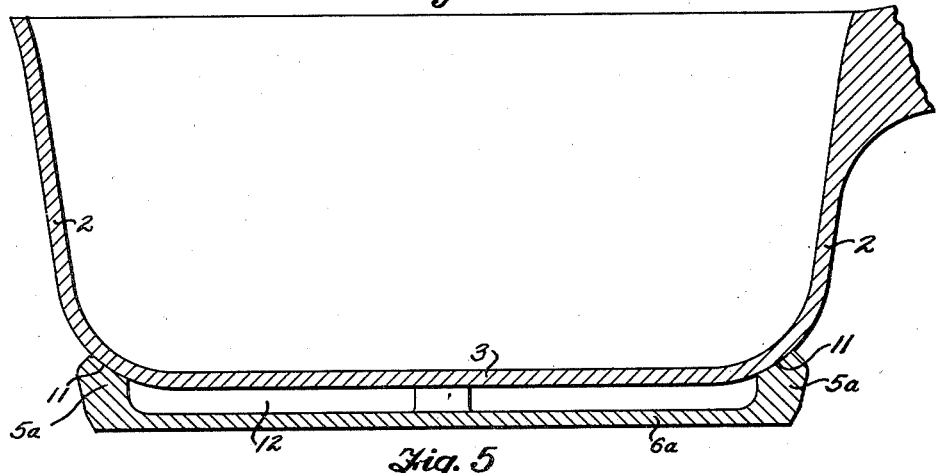
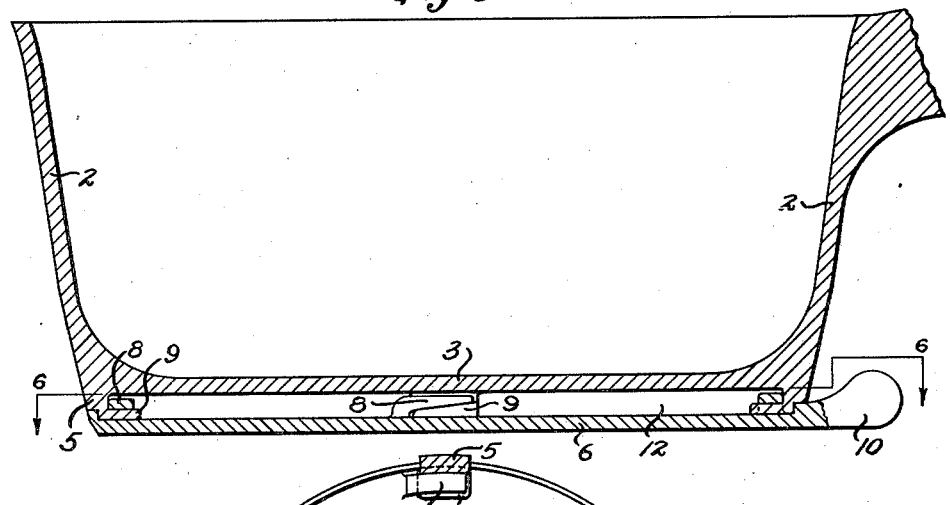
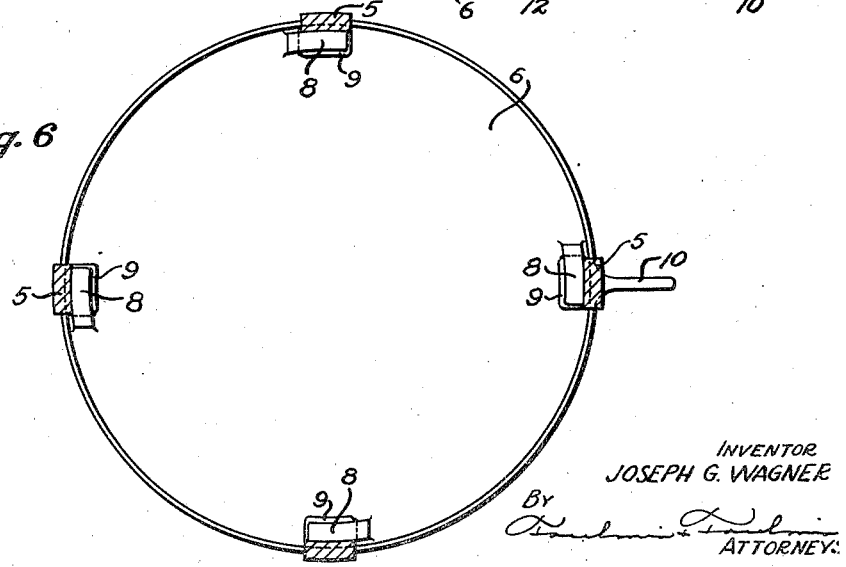
INVENTOR
JOSEPH G. WAGNER Patented Aug. 29, 1939

2,170,880

UNITED STATES PATENT OFFICE 2,170,880

COOKING UTENSIL

Joseph G. Wagner, Sidney, Ohio, assignor to The Wagner Manufacturing Company, Sidney, Ohio, a corporation of Ohio Application December 2, 1938, Serial No. 243,615

7 Claims. (Cl. 53—8)

This invention relates to a cooking utensil.

It is the object of this invention to provide a utensil so arranged that the heat from the flame beneath it is distributed from the flame to the side walls of the container before the heat reaches the bottom of the container.

It is an object to so distribute the heat over a false bottom that the heat is uniformly delivered to the side walls of the container so that it will be conducted from the juncture of the bottom and side walls of the container upwardly through the side walls and laterally through the bottom of the container.

It is a further object to provide this false bottom spaced from the main bottom of the container so that the air circulatory space therebetween will provide an insulation area to prevent the concentration of heat on the main bottom of the container by radiation from the false bottom. The air between the bottom of the container and the bottom plate constituting the false bottom is an insulating medium and a cooling medium. The air tends to circulate, thereby bringing about a uniform temperature for the entire body of the container.

This prevents the concentration of heat which leads to burning and sticking of the food in the container.

It is an object of this invention to physically engage the false bottom at the juncture of the sides and bottom of the container because engagement to the container inwardly from the side walls leads to a concentration of heat on the bottom of the container with subsequent burning and sticking of the food in the container.

It is an object to provide such a construction in a cast aluminum cooking utensil.

It is an object to provide both a detachable bottom or a slidable bottom and to connect said bottom at intervals to the edges of the bottom of the container.

Referring to the drawings:

Figure 4 is a modified form shown in section in which the false bottom is not attached to the utensil but merely supports it in position at spaced points adjacent the juncture of its side walls with its bottom.

Figure 5 is a section similar to that of Figure 4 showing another modified form in which the false bottom is provided with a handle and is slidably mounted in spaced position with respect to the bottom of the utensil so that the bottom can be removed for cleaning.

Figure 6 is a section on the line 6—6 of Figure 5 looking in the direction of the arrows.

Figure 1:
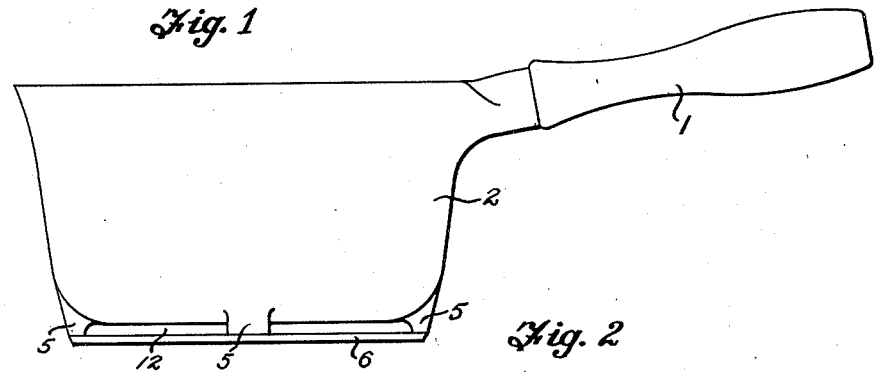
Figure 1 is a side elevation of the container with a false bottom.
Figure 2:
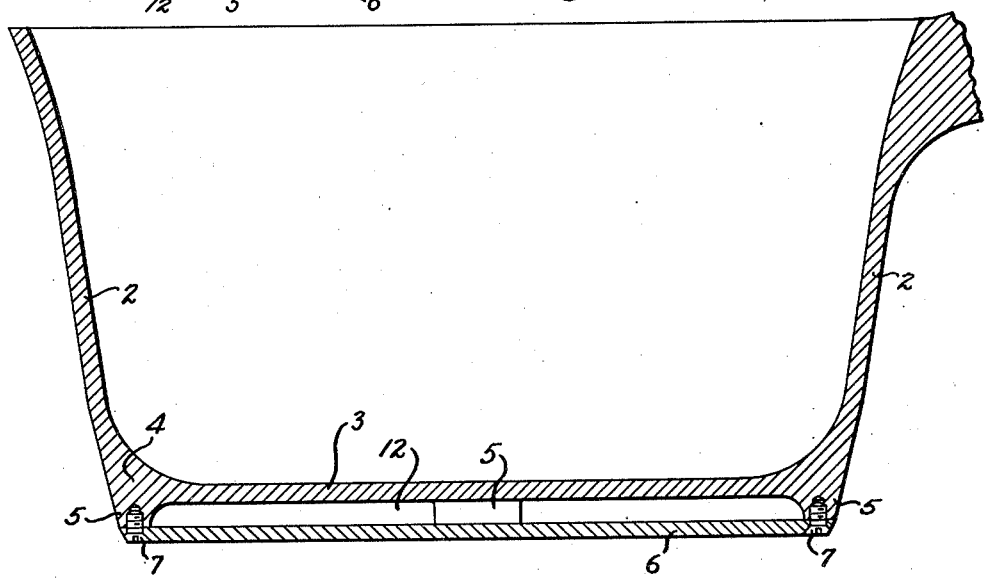
Figure 2 is a section taken vertically through the container and enlarged showing the method of attachment and spacing of the false bottom of the container.
Figure 3:
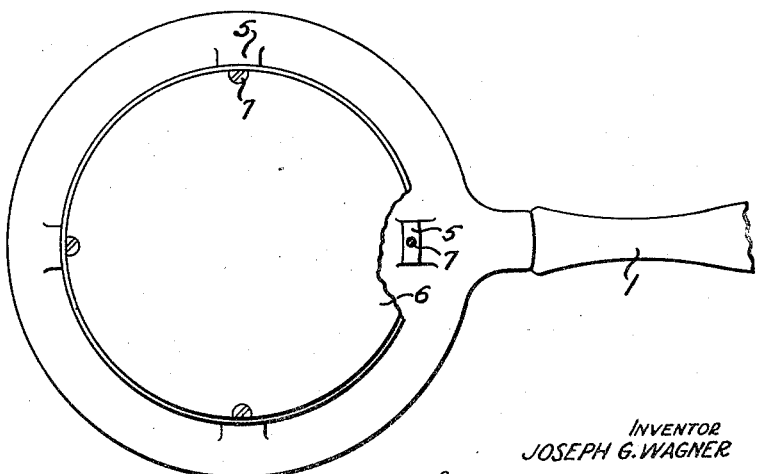
Figure 3 is a bottom plan view partly broken away showing the arrangement of the false bottom when detachably attached by screws to the bottom of the utensil.

Referring to the drawings in detail, 1 indicates a handle mounted on the cast aluminum utensil that has side walls 2 and a bottom 3 that are joined together in the general area designated 4. This area 4 is extended downwardly to form lugs 5 at spaced intervals. There is mounted on these lugs 5 a plate 6 which is a heat diffusion and insulation plate. It may be attached as shown in Figures 2 and 3 by screws 7, or it may be attached as shown in Figures 5 and 6 by having the plate slidably engaged with its lugs 8 by fingers 9 formed on the projections 5 so as to form interlocking wedging engagement. In this manner the plate 6 can be attached and detached readily by grasping the handle 10. This facilitates cleaning of the plate.

Alternatively, an arrangement may be employed as in Figure 4 in which the utensil is merely rested upon a plate 6a which has upwardly projecting spaced fingers 5a, the arcuate surface of which at 11 receives the portions 4 of the utensil.

Throughout all these various modifications runs the common inventive principle of having a spaced heat diffusion plate beneath the utensil adapted to be engaged by the flame so as to distribute the heat directly to the side walls 2 of the utensil and thence also through the bottom 3 so that there is a uniform distribution of heat throughout the bottom and the side walls to prevent burning or sticking of the food. This has the effect of a steam boiler without the necessity of utilizing a boiler or insulating water pans or the like.

The air tends to circulate in the space 12 between the bottom 3 and the plate 6. This further distributes the heat.

One of the principal features of this invention is the location of the supporting feet or lugs 5 at the point of the juncture of the bottom 3 and side walls 2. If these lugs are placed further inwardly, there is a tendency to directly communicate the heat from the plate 6 immediately to the bottom 3 to cause burning and sticking of the food. By so arranging the plate that distribution of the heat is insured into the greater area of the side walls, then the amount of heat that is distributed to the bottom 3 will be more nearly in proportion to its area and capacity for distributing the heat. It will be understood that I desire to comprehend within my invention such modifications as may be necessary to adapt it to varying conditions and uses.

It will be further understood that I comprehend within my invention and the claims covering it the use of other metals than aluminum or the use of a cast or welded false bottom, or the use of a cast iron or sheet steel plate in conjunction with a cast aluminum body of the utensil. It will be understood that the invention is not limited to any particular materials although the problem particularly arises in connection with a utensil of cast aluminum. The method of attaching may be by integral casting of the false bottom or by welding, or by any of the various means illustrated and described hereinbefore.

Having thus fully described my invention, what I claim as new and desire to secure by Letters Patent, is:

1. In combination, a cooking utensil, a false bottom, and means on the lower portion of said bottom of the utensil adapted to hold said false bottom in spaced relationship from the bottom of the utensil, said means being in the form of lugs arranged at widely spaced intervals so as to permit the circulation of air between the bottom of the utensil and the top of the false bottom, said lugs being located adjacent the periphery of the bottom of the utensil at the juncture of the side walls with the bottom of the utensil the peripheral length of said lugs being much less than the peripheral length of said spaces therebetween, and said utensil bottom and said false bottom being free of heat conducting connecting means therebetween inwardly of said periphery.

2. In combination, a cooking utensil, a plurality of marginal lugs formed on the bottom thereof adjacent the periphery of said bottom at spaced intervals, and a plate mounted on said lugs in spaced relationship to the bottom of the utensil said assembly being free of heat conducting connecting means between said utensil bottom and said plate inwardly of said periphery, said lugs being spaced at intervals considerably longer peripherally than said lugs.

3. In combination, a cooking utensil, a plurality of marginal lugs formed on the bottom thereof adjacent the periphery of said bottom at spaced intervals, a plate mounted on said lugs in spaced relationship to the bottom of the utensil, and means on said plate and said lugs for slidably engaging said plate with said lugs.

4. In combination, a cooking utensil, a plurality of marginal lugs formed on the bottom thereof adjacent the periphery of said bottom at spaced intervals, a plate mounted on said lugs in spaced relationship to the bottom of the utensil, means on said plate and said lugs for slidably engaging said plate with said lugs, and a handle on said plate said handle extending upwardly from the bottom of said plate and radially outwardly therefrom.

5. In combination, a cooking utensil, a spaced heat diffusion plate, and a plurality of lugs interposed between said plate and said utensil adjacent the periphery of the bottom at the juncture of the bottom and the side walls thereof at spaced intervals whereby the utensil is supported by the plate with its bottom in spaced relationship thereto, said plate and utensil being free from heat conducting connecting means therebetween inwardly of said periphery.

6. In combination, a cooking utensil having a plurality of marginal bottom cam lugs, a spaced heat diffusion plate having corresponding engaging lugs, and means on said plate for moving it into rotating, locking engagement with the lugs on the bottom of the utensil.

7. A new article of manufacture for use as a heat distributor for cooking utensils comprising a plate and a plurality of marginal spaced upwardly extending projections adapted to receive and support a utensil in spaced relationship to the plate and to engage the utensil adjacent the periphery of the bottom at the juncture of the bottom and the side walls thereof said plate being free from upwardly extending heat conducting means inwardly of said marginal projections.

JOSEPH G. WAGNER.